(12) United States Patent
Gengrinovich et al.

(10) Patent No.: US 8,733,913 B2
(45) Date of Patent: May 27, 2014

(54) LIQUID DELIVERY SYSTEM

(71) Applicant: Hewlett-Packard Development Company, L.P., Houston, TX (US)

(72) Inventors: Semion Gengrinovich, Ramat Gan (IL); Itzhak Horovitz, Moshav Dvora (IL); Chen Turkenitz, Ramat Hasharon, TX (US)

(73) Assignee: Hewlett-Packard Development Company, L.P., Houson, TX (US)

( * ) Notice: Subject to any disclaimer, the term of this patent is extended or adjusted under 35 U.S.C. 154(b) by 0 days.

(21) Appl. No.: 13/734,897

(22) Filed: Jan. 4, 2013

(65) Prior Publication Data
US 2013/0118597 A1    May 16, 2013

Related U.S. Application Data

(63) Continuation of application No. PCT/US2010/041030, filed on Jul. 6, 2010.

(51) Int. Cl.
    *B41J 2/175*    (2006.01)
(52) U.S. Cl.
    USPC .......................................................... 347/86
(58) Field of Classification Search
    USPC ................... 347/84–87, 54; 200/517
    See application file for complete search history.

(56) References Cited

U.S. PATENT DOCUMENTS

| | | | |
|---|---|---|---|
| 4,342,042 A | | 7/1982 | Cruz-Uribe et al. |
| 4,458,123 A | * | 7/1984 | Hengesh et al. ............... 200/517 |
| 6,145,973 A | * | 11/2000 | Wu et al. .......................... 347/86 |
| 6,837,575 B2 | | 1/2005 | Usui |
| 6,866,355 B2 | | 3/2005 | Aruga et al. |
| 7,040,742 B2 | | 5/2006 | Tobinai et al. |
| 7,192,110 B2 | | 3/2007 | Taguchi et al. |
| 7,370,923 B2 | | 5/2008 | Tanno et al. |
| 7,559,634 B2 | | 7/2009 | Miyazawa |
| 2009/0073244 A1 | * | 3/2009 | Silverbrook .................... 347/86 |
| 2009/0213194 A1 | * | 8/2009 | Silverbrook .................... 347/86 |
| 2010/0245503 A1 | * | 9/2010 | Silverbrook .................... 347/86 |

FOREIGN PATENT DOCUMENTS

JP    2004-209665    7/2004

OTHER PUBLICATIONS

International Search Report for PCT/US2010/041030.

* cited by examiner

*Primary Examiner* — Kristal Feggins

(57) ABSTRACT

A liquid delivery system and method move an air impermeable membrane adjacent a liquid chamber in response to withdrawal of liquid from the chamber to move a plunger. The plunger moves between a first position fluidly connecting a fluid source and a fluid actuated valve to open the valve and supply liquid to the liquid chamber and a second position blocking connection of the fluid source and the fluid actuated valve.

20 Claims, 3 Drawing Sheets

LIQUID DELIVERY SYSTEM

CROSS-REFERENCE TO RELATED PATENT APPLICATIONS

The present application is a continuation of co-pending PCT/US10/41030 filed on Jul. 6, 2010 by Semion Gengrinovich, Itzhak Horovitz and Chen Turkenitz, and entitled LIQUID DELIVERY SYSTEM, the full disclosure of which is hereby incorporated by reference.

BACKGROUND

Some liquid delivery systems replenish liquid as it is withdrawn from a tank. During such replenishment, the liquid may contact air which becomes dissolved in the liquid. Sensors used to determine fill levels in the tank may additionally increase the cost and complexity of such systems.

DETAILED DESCRIPTION OF THE EXAMPLE EMBODIMENTS

Figure 1:
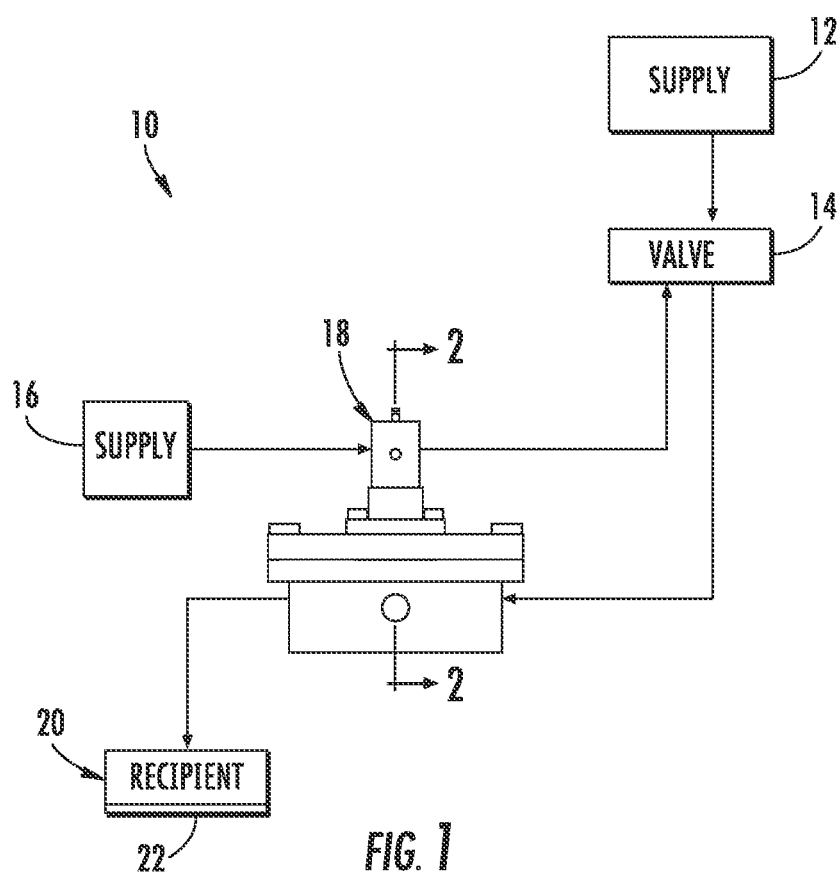
FIG. 1 is a schematic illustration of a liquid delivery system according to an example embodiment.

FIG. 1 schematically illustrates liquid delivery system 10 according to an example embodiment. Liquid delivery system 10 delivers liquid, such as ink, to liquid ejectors, such as one or more print heads. As will be described hereafter, liquid delivery system 10 delivers such liquids with a less complex arrangement and with less air or gas becoming dissolved in the liquid.

Liquid delivery system 10 includes liquid supply 12, fluid actuated valve 14, fluid supply 16, regulator tank 18 and a liquid recipient 20. Liquid supply 12 comprises a supply of liquid to be delivered to regulator tank 18. In one embodiment, liquid supply 12 comprises a volume containing an ink for use in printing images on a print medium.

Fluid actuated valve 14 comprises a valve mechanism operably coupled between liquid supply 12 and regulator tank 18. Valve 14 actuates between an open state in which valve 14 allows liquid from supply 12 to flow to regulator tank 18 and a closed state in which valve 14 is closed, inhibiting the flow of liquid from supply 12 through valve 14 to regulator tank 18. In one embodiment, the valve 14 comprises pneumatic valve, wherein the fluid is a gas. For example, in one embodiment, valve 14 comprises a compressed air valve configured to be actuated by a fluid comprising compressed gas or air. In another embodiment, valve 14 comprises a pneumatic valve configured the actuated by a vacuum applied to the valve 14. In yet another embodiment, valve 14 comprises a fluid valve wherein the fluid is a liquid. For example, in one embodiment, valve 14 comprises a hydraulic valve configured to be actuated by a hydraulic oil or liquid.

Fluid supply 16 comprises a source of the fluid for actuating valve 14. In embodiments where valve 14 comprises a pneumatic valve, supply 16 supplies either a compressed gas or a vacuum for actuating valve 14. In embodiments where valve 14 comprises a hydraulic valve, supply 16 supplies a pressurized hydraulic liquid or fluid for actuating valve 14.

Regulator tank 18 receives liquid from supply 12 through valve 14. Regulator tank 18 additionally regulates or controls the supply of fluid from supply 16 to valve 14 based upon or in response to an amount of liquid within tank 18. Regulator tank 18 further delivers liquid or supplies liquid to recipient 20.

As liquid is withdrawn from regular tank 18 by recipient 20, the level of liquid within regular tank 18 falls. In response to the level of liquid within regular tank 18 following to a predetermined extent, fluid supply 16 connects to valve 14. As discussed above, fluid connection between fluid supply 16 and valve 14 results in valve 14 opening, allowing liquid from supply 12 to be delivered through the 14 to regulator tank 18. As a result, regulator tank 18 is automatically filled or resupplied with liquid from supply 12. In other words, the level of liquid within regulator tank 18 is self regulated.

In the example illustrated, liquid recipient 20 receives liquid from regulator tank 18. In one embodiment, liquid recipient 20 includes at least one print head 22 through which the liquid is ejected onto a substrate or printed medium. In the example illustrated, print head 22 comprises at least one piezo electric print head. In other embodiments, print head 20 may comprise other fluid ejectors such as one of more thermal resistive print heads. As will be described hereafter, regulator tank 18 regulates the supply of liquid to regulator tank 18, and the supply of liquid to liquid recipient 20, with reduced contact of the liquid with air, reducing the amount of air that is dissolved in the liquid. As a result, the print head 22 may more reliably or effectively eject fluid. In other embodiments, liquid recipient 20 may be omitted, wherein liquid is delivered by regulator tank 18 to other liquid recipients or is directly consumed from regulator tank 18 by one or more liquid consuming structures, such as print heads, directly attached to regulator tank 18.

Figure 2:
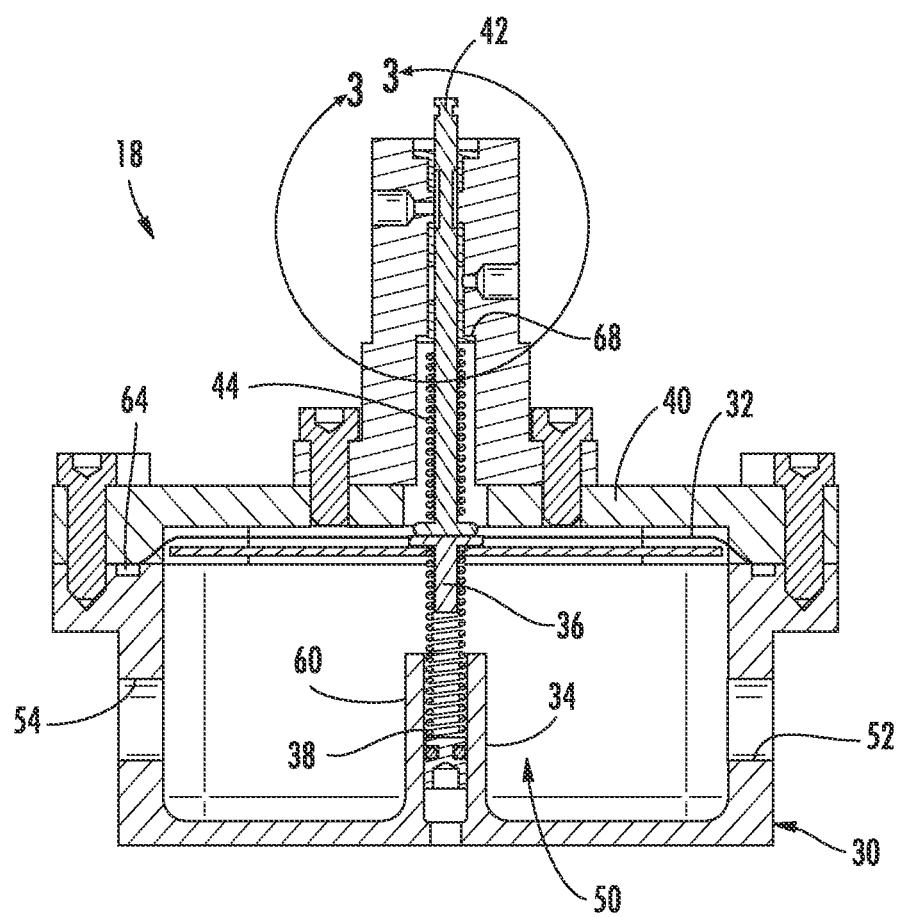
FIG. 2 is a sectional view of a regulator tank of the liquid delivery system of FIG. 1 taken along line 2-2 according to an example embodiment.

FIG. 2 illustrates regulator tank 18 in detail. As shown by FIG. 2, regulator tank 18 comprises tank body 30, membrane 32, pusher guide 34, pusher 36, bias 38, head 40, plunger 42 and bias 44. Tank body 30 comprises one or more structures joined to one another which partially define a liquid storing and receiving chamber 50. Chamber 50 includes an inlet 52 configured to receive liquid from supply 12 through valve 14 (shown in FIG. 1). Chamber 50 additionally includes an outlet 54 configured to allow the discharge of fluid from chamber 50 to liquid recipient 20 (shown in FIG. 1). A portion of chamber 50 is bounded by membrane 32.

Membrane 32 comprises an air impermeable panel, layer, film, sheet or the like extending across chamber 50. Membrane 32 cooperates with body 50 to enclose chamber 50 except for inlet 52 and outlet 54. Membrane 32 is configured to contact a surface of the liquid within chamber 50 such that air between membrane 32 and a top surface of the liquid within chamber 50 is reduced or eliminated. Membrane 32 facilitates transmission of force between pusher 36 and plunger 42 while isolating the interior of chamber 50 from plunger 42 and air that may exist above membrane 32 and adjacent to plunger 42. Membrane 32 facilitates actuation or movement of plunger 42 in response to changes in the level of liquid within chamber 50 without the liquid within chamber 50 contacting plunger 42 and with reduced contact between the liquid within chamber 50 and air.

According to one example embodiment, membrane 32 comprises polypropylene. In other embodiments, membrane 32 may comprise other materials. In the example illustrated, membrane 32 is secured to body 30 over and across chamber 50 by being captured between body 30 and head 40. In other embodiments, membrane 32 may be secured to body 30 in other fashions.

Pusher guide 34 comprises one or more structures configured to guide movement of pusher 36 and/or bias 38. In the example illustrated, pusher guide 34 comprises a channel or bore 60 extending from body 50 and slidably receiving at least bias 38 which is connected to pusher 36. In other embodiments, bore 60 may additionally receive pusher 36. In yet other embodiments, guide 34 may comprise other structures for guiding movement of at least pusher 36. For example, although guide 34 is illustrated as being integrally formed as a single unitary body with body 30, extending from a floor of body 30, in other embodiments, guide 34 may comprise other structures fastened, welded, bonded or otherwise joined to body 30, within chamber 50 or outside of chamber 50.

Pusher 36 comprises a plunger or other member extending opposite to plunger 42 so as to move and transmit force to plunger 42 across membrane 32. In the example illustrated, pusher 36 is configured to linearly move against membrane 42 in a direction substantially perpendicular to membrane 32. In other embodiments pusher 36 may be configured to move against membrane 32 to transmit force to plunger 42 in other manners. For example, in other embodiments, pusher 36 may alternatively rotate or pivot towards and away from membrane 32 so as to transmit force to plunger 42. In some embodiments, pusher 36 may be omitted.

In the example illustrated, pusher 36 is captured between bias 38 and membrane 32 within chamber 50 and opposite to plunger 42. In other embodiments, pusher 36 may have other configurations and its relationship to bias 38 may be different. For example, in one embodiment, pusher 36 may alternatively be integrally formed as a single unitary body with bias 38 or may be omitted where bias 38, itself, exerts a force against membrane 32 and against plunger 42.

Bias 38 comprises one or more members configured to resiliently bias or urge plunger 36 towards membrane 32 and towards plunger 42. In the example illustrated, bias 38 comprises a compression spring having a lower end captured and guided by guide 34 and an upper end receiving and coupled to pusher 36. In other embodiments, bias 38 may have other configurations and locations. For example, in other embodiments, bias 38 may alternatively comprise a tension spring or a leaf spring. In some embodiments, bias 38 may be provided as part of pusher 36.

Head 40 comprises one or more structures coupled to body 30 and configured to guide movement of plunger 42 towards and away from pusher 36 and membrane 32. Head 40 is further configured to facilitate connection of fluid source 16 valve 14 (shown in FIG. 1) upon predetermined extent and direction of movement of plunger 42. In the example illustrated, head 40 is fastened to body 40 so as to capture membrane 32 to retain membrane 32 across chamber 50. Tank 18 additionally includes a gasket 64 encircling and extending between head 40 and body 32 and hermetically sealing between head 40 and body 30. In other embodiments, gasket 64 may be omitted. For example, in some embodiments, membrane 32 may additionally be configured to seal between body 40 and membrane 30.

Plunger 42 comprises a member extending within head 40 to a location opposite to plunger 36. Plunger 42 extends on opposite side of membrane 32 as pusher 36 and receives force from or applies force to pusher 36 through membrane 32. As will be described hereafter, plunger 42 is configured such that movement of plunger 42 in response to receiving force from pusher 36 results in fluid supply 16 and valve 14 (shown in FIG. 1) being connected or disconnected to supply 12 to supply or discontinue the supply of liquid from supply 12 to tank 18 through valve 14 (shown in FIG. 1).

Bias 44 comprises one or more members configured to resiliently urge plunger 42 towards membrane 32 and towards pusher 36. In the example illustrated, bias 44 comprises a compression spring having an upper end captured and bearing against an internal shoulder 68 of head 40 and a lower end receiving and coupled to plunger 42. In other embodiments, bias 44 may have other configurations and locations. For example, in other embodiments, bias 44 may alternatively comprise a tension spring or a leaf spring. In some embodiments, bias 44 may be provided as part of plunger 42.

Figure 3:
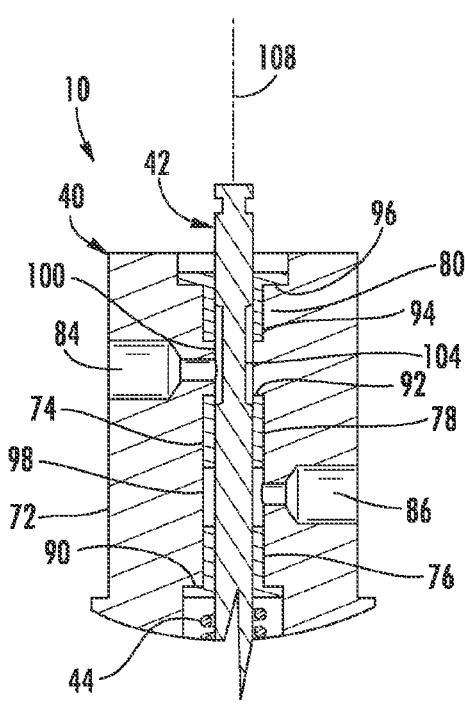
FIG. 3 is an enlarged fragmentary sectional view of the regulator tank of FIG. 2 taken along line 3-3 and illustrating a plunger in a disconnecting position according to an example embodiment.

FIG. 3 illustrates head 40 and plunger 42 in more detail. FIG. 3 illustrates plunger 42 in a state or position with respect to head 40 such that fluid supply 16 is disconnected from valve 14. As shown by FIG. 3, head 40 includes structure 72, bore 74, sealing bushings 76, 78 and 80, inlet 84 and outlet 86. Structure 72 comprises the body of head 40 in which bore 74, inlet 84 and outlet 86 are formed. Although illustrated as a column or post projecting away from a remainder of head 40 and away from body 30 regular tank 18, in other embodiments, structure 72 may have other configurations and locations.

Bore 74 comprises a channel, passage or elongate opening extending within structure 72 across or spanning each of the inlet 84 and outlet 86. Bore 74 opens into communication with membrane 32. Bore 74 receives sealing bushings 76, 78 and 80 as well as plunger 42. In the example illustrated, bore 74 includes shoulders 90, 92, 94 and 96 for locating and supporting bushings 76, 78 and 80. In other embodiments, such shoulders may be omitted where other structures or mechanisms are used to retain one or more of bushings 76, 78 and 80 in place. In embodiments where other sealing arrangements or mechanisms are used in lieu of bushings 76, 78 and 80, such shoulders may be omitted.

Sealing bushings 76, 78 and 80 comprise bushings configured to form a seal between structure 72 and plunger 42 to inhabit the flow of fluid between structure 72 and plunger 42. In one embodiment, bushings 76, 78 and 80 are formed from the material distinct from structure 72 and plunger 42. For example, in one embodiment, bushings 76, 78 and 80 are formed from one of more resiliently compressible, elastic or rubber-like materials. In some embodiments, bushings 76, 78 and 80 may additionally be formed from one of more low friction materials or be coated with one or more low friction materials to facilitate sliding movement of plunger 42 relative to such bushings 76, 78 and 80.

As shown by FIG. 3, bushing 76 is generally top-hat shaped, abutting against shoulder 90 and projecting towards outlet 86. Bushing 78 is tubular shaped and abuts against shoulder 92. Bushings 76 and 78 are spaced from one another along bore 74 and along plunger 42 to form a cavity 98 which encircles plunger 42 while being connected to outlet 86. Bushing 80 is generally top-hat shaped, abuts against shoulders 94 and 96 and extends from shoulder 94 towards shoulder 96. Bushings 78 and 80 are spaced from one another by shoulders 92 and 94 so as to form a cavity 100 there between that encircles plunger 42 while extending in connection with and adjacent to inlet 84.

In other embodiments, one or more of bushings 76, 78 and 80 may be omitted where other mechanisms are structures are used to provide a seal between plunger 42 and structure 72 also forming cavities 98 and 100. For example, in another embodiment, bushings 76, 78 and 80 may be omitted where plunger 42 and structure 72, themselves, cooperate to form a seal between plunger 42 and structure 72 on opposite sides of inlet 84 and on opposite sides of outlet 86 along bore 74. In one embodiment, one or both of the surfaces of bore 74 and plunger 42 are formed from a compressible or rubber-like material configured to provide such a seal. In some embodiments, cavities 98 and 100 may be omitted where movement of plunger 42 provides a direct connection between inlet 84 and outlet 86.

Inlet 84 comprises a passage extending into communication with cavity 100 and/or bore 74. Inlet 84 facilitates fluid communication or fluid flow between cavity 100 and/or bore 74 and fluid source 16 (shown in FIG. 1). Outlet 86 comprises a passage extending into communication with cavity 98 and/or bore 74. Outlet 86 facilitates fluid communication or fluid flow between cavity 98 and/or bore 74 and valve 14 (shown in FIG. 1). Although illustrated as extending on opposite sides of structure 72, outlet 84 and inlet 86 may have different sizes, shapes and locations. For example, in other embodiments, outlet 86 may be on a same side of structure 72. Likewise, inlet 84 may be closer to chamber 50 than outlet 86.

As shown by FIG. 3, plunger 42 comprises a member extending within head 40 to a location opposite to plunger 36. Plunger 42 extends on an opposite side of membrane 32 as pusher 36 and receives force from or applies force to pusher 36 through membrane 32. Plunger 42 includes neck down region 104. Neck down region 104 comprises a portion of plunger 42 having a reduced outer dimension or diameter so as to form a fluid passageway axially along plunger 42. Neck down region 104 has a length sized so as to span or extend between inlet 84 and outlet 86 when plunger is in a connecting position shown in FIG. 4 and so as to not extend across or connect inlet 84 and outlet 86 when plunger 42 is in a disconnecting position shown in FIG. 3.

Figure 4:
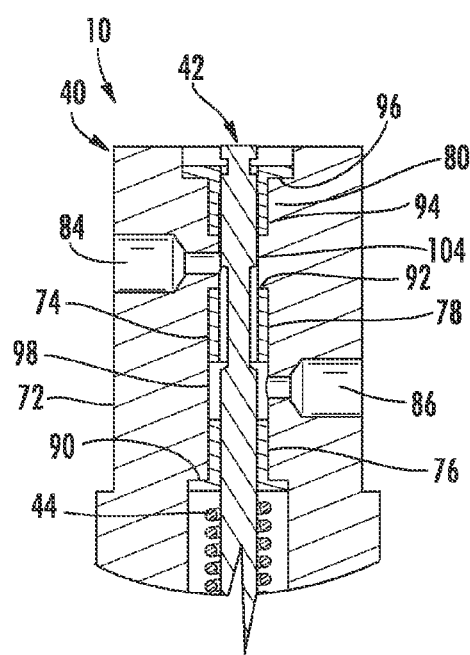
FIG. 4 is an enlarged fragmentary sectional view of the regulator tank of FIG. 2 taken along line 3-3 and illustrating the plunger in a connecting position according to an example embodiment.

Although plunger 42 is illustrated as utilizing neck down region 104 for fluidly connecting Inlet 84 and outlet 86 when plunger 42 is in the connecting position shown in FIG. 4, in other embodiments, plunger 42 may include other fluid passages for connecting inlet 84 and outlet 86 when plunger 42 is in the connecting position. For example, in lieu of utilizing a neck down region 104 that completely encircles plunger 42, plunger 42 may include an axially extending groove, channel or slit which does not completely extend 360 degrees about a longitudinal axis 108 of plunger 42. In one embodiment in which outlet 84 and plunger 86 are axially aligned on a single side of plunger 42, the channel or slit may linearly extend along an exterior of plunger 42 parallel to the axis 108 of plunger 42.

In embodiments where inlet 84 and outlet 86 are circumferentially or angularly spaced from one another about axis 108 of plunger 42 (such as on opposite sides of plunger 42 or a angularly spaced 90 degrees from one another about the axis 108 of plunger 42), the groove may linearly extend along the exterior of plunger 42 at an angle oblique to axis 108 or may spirally extend along an exterior of plunger 42. In still other embodiments, in lieu of providing a fluid passage extending along an exterior of plunger 42, plunger 42 may include an internal bore or passage having exterior openings located so as to fluidly connect inlet 84 and outlet 86 when plunger 42 is in the connecting state shown in FIG. 4 and to disconnect inlet 84 and outlet 86 when plunger 42 is in the disconnecting state shown in FIG. 3.

In operation, chamber 50 of tank 18 is filled with liquid, such as ink, so as to fill or occupy substantially all, if not all, available volume and so as to be in contact with membrane 32. Upon withdrawal or consumption of liquid from chamber 50, pressure within the chamber 50 reduced. As a result, membrane 32 bends or moves in a direction perpendicular to membrane 32 towards the floor of body 30. During such movement of membrane 32, bias 44 additionally pushes or urges plunger 42 in a direction towards pusher 36 such that plunger 42 maintains contact with membrane 32 and such that membrane 32 maintains contact with the remaining liquid within chamber 50. Consequently, contact between remaining liquid within chamber 50 and any air that may be present in tank 18 is minimized.

As plunger 42 moves in response to bending or movement of membrane 32, the air passage provided by neck down 104 moves from the disconnecting position shown in FIG. 3 to the connecting position shown in FIG. 4. As a result, fluid, such as compressed air or liquid, is permitted to flow from fluid supply 16 (shown in FIG. 1) through inlet 84, through neck down region 104 into cavity 98 and through outlet 86 to valve 14 (shown in FIG. 1). The fluid transmitted to valve 14 operates valve 14 to actuate valve 14 from a closed state to an open state, allowing liquid to be supplied from supply 12 (shown in FIG. 1) through valve 14 to chamber 50 of tank 18 through inlet 52. In one embodiment, an additional pump (not shown) may be used to deliver liquid from supply 12 through valve 14 to tank 18.

When tank 18 has been sufficiently refilled with liquid from supply 12 through valve 14, pressure within chamber 50 increases, bending or returning membrane 32 in a direction away from pusher 36 to the state shown in FIG. 2. During this return of membrane 32, bias 38 urges pusher 36 towards plunger 42 against the bias provided by bias 44. During such bending or movement of membrane 32, plunger 42 linearly moves within bore 74 to reposition neck down region 104 from the connecting position shown in FIG. 4 back to the disconnecting position or state shown in FIG. 3. As a result, the supply of fluid to valve 14 is cut off or stopped, resulting in valve 14 returning to a closed state. In one embodiment, valve 14 is resiliently biased by a spring (not shown) towards the closed state in the absence of fluid being supplied from supply 16. Consequently, the flow of liquid from supply 12 to tank 18 is discontinued until the next refill cycle begins.

Figure 5:
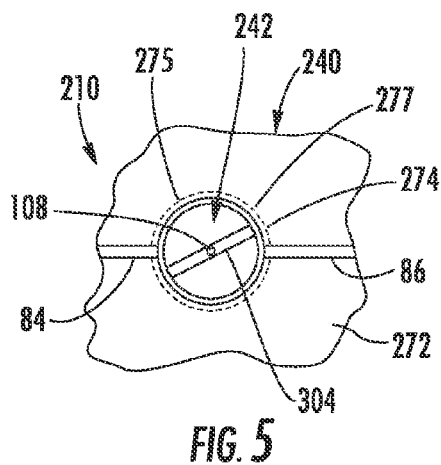
FIG. 5 is a fragmentary sectional view of another embodiment of the liquid delivery system of FIG. 1, illustrating a plunger in a disconnecting position according to example embodiment.
Figure 6:
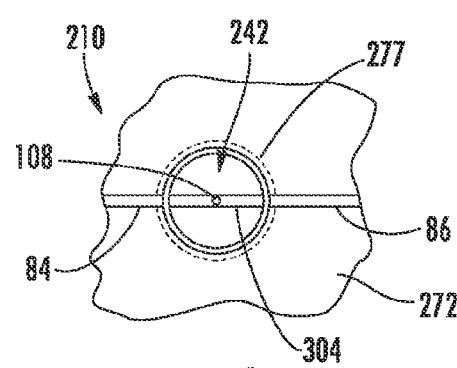
FIG. 6 is a fragmentary sectional view of the liquid delivery system of FIG. 5, illustrating the plunger in a connecting position according to an example embodiment.

FIGS. 5 and 6 schematically illustrate liquid delivery system 210, another embodiment of liquid delivery system 10 shown and described above with respect to FIGS. 1-4. Liquid delivery system 210 is similar or identical to liquid delivery system 10 except that liquid delivery system 210 includes head 240 and plunger 242 in place of head 40 and plunger 42, respectively. Those remaining components of liquid delivery system 210 are illustrated and described above with respect to liquid delivery system 10.

Head 240 is similar to head 40 except that had 240 includes structure 272 instead of structure 72. Structure 272 includes a bore 274, at least a portion of which is internally threaded with helical threads of 275. Bore 274 receives plunger 242. As with head 240, head 240 includes inlet 84 and outlet 86 (schematically shown).

Plunger 242 is similar to plunger 42 except that plunger 242 includes external threads 277 and fluid passage 304. External threads 277 extend along at least a portion of plunger 242 and threadably contact or engage internal threads 275 of bore 274 to seal between plunger 242 and structure 272. In addition, the inter-engagement of threads 275, 277 converts linear forces received during movement of membrane 32 and pusher 36 (shown in FIG. 1) into rotational torque so as to rotate plunger 42 about axis 108 between a disconnecting state of position shown in FIG. 5 and a connecting state or position shown in FIG. 6. In one embodiment, threads 275 and 276 are axially spaced from fluid passage 304 so as to not extend across the openings of passage 304, facilitating enhanced sealing of passage 304 when plunger 242 is in the disconnecting position shown in FIG. 5.

Fluid passage 304 comprises a channel, tunnel, groove, passage or other opening extending through plunger 242. Passage 304 is configured to facilitate the flow of fluid across plunger 242 from inlet 84 to outlet 86 when plunger 242 is in the connecting state shown in FIG. 6. Passage 304 is configured to be closed or occluded at one or both opposite ends by structure 272 when plunger 242 is in the disconnecting position shown in FIG. 5.

Although fluid passage 304 is illustrated at extending in a straight line, linearly through and across plunger 242, in other embodiments, fluid passage 304 may have other configurations for connecting inlet 84 and outlet 86 when plunger 42 is in the connecting position. For example, plunger 42 may alternatively include a fluid passage that comprises a channel or groove linearly or non-linearly extend along an outer circumferential surface plunger 42. In some embodiments, fluid passage 304 may extend through plunger 242 in a non-linear fashion. For example, in embodiments where inlet 84 and outlet 86 are angularly spaced from one another by 90 degrees about axis 108, fluid passage 304 may have an L-shape through plunger 242.

Liquid delivery system 210 functions similarly to liquid delivery system 10. Chamber 50 of tank 18 (shown in FIG. 1) is filled with liquid, such as ink, so as to fill or occupy substantially all, if not all, available volume and so as to be in contact with membrane 32. Upon withdrawal or consumption of liquid from chamber 50, pressure within the chamber 50 reduced. As a result, membrane 32 bends or moves in a direction perpendicular to membrane 32 (shown in FIG. 1) towards the floor of body 30. During such bending of membrane 32, bias 44 additionally pushes or urges plunger 42 in a direction towards pusher 36 such that plunger 242 maintains contact with membrane 32 and such that membrane 32 maintains contact with the remaining liquid within chamber 50. Consequently, contact between remaining liquid within chamber 50 and any air that may be present in tank 18 is minimized.

The force applied to plunger 242 as a result of movement of membrane 32 causes plunger 242 to rotate about axis 108 to move fluid passage 304 moves from the disconnecting position shown in FIG. 5 to the connecting position shown in FIG. 6. As a result, fluid, such as compressed air or liquid, is permitted to flow from fluid supply 16 (shown in FIG. 1) through inlet 84, through flip passage 304 and through outlet 86 to valve 14 (shown in FIG. 1). The fluid transmitted to valve 14 operates valve 14 to actuate valve 14 from a closed state to an open state, allowing liquid to be supplied from supply 12 (shown in FIG. 1) through valve 14 to chamber 50 of tank 18 through inlet 52. In one embodiment, an additional pump (not shown) may be used to deliver liquid from supply 12 through valve 14 to tank 18.

When tank 18 has been sufficiently refilled with liquid from supply 12 through valve 14, pressure within chamber 50 increases, bending or returning membrane 32 in a direction away from pusher 36 to the state shown in FIG. 2. During this return of membrane 32, bias 38 urges pusher 36 towards plunger 242 against the bias provided by bias 44. During such bending of membrane 32, plunger 242 rotates within bore 274 to reposition good passage 304 from the connecting position shown in FIG. 5 back to the disconnecting position or state shown in FIG. 6. As a result, the supply of fluid to valve 14 is cut off or stopped, resulting in valve 14 returning to a closed state. In one embodiment, valve 14 is resiliently biased by a spring (not shown) towards the closed state in the absence of fluid being supplied from supply 16. Consequently, the flow of liquid from supply 12 to tank 18 is discontinued until the next refill cycle begins.

Although the present disclosure has been described with reference to example embodiments, workers skilled in the art will recognize that changes may be made in form and detail without departing from the spirit and scope of the claimed subject matter. For example, although different example embodiments may have been described as including one or more features providing one or more benefits, it is contemplated that the described features may be interchanged with one another or alternatively be combined with one another in the described example embodiments or in other alternative embodiments. Because the technology of the present disclosure is relatively complex, not all changes in the technology are foreseeable. The present disclosure described with reference to the example embodiments and set forth in the following claims is manifestly intended to be as broad as possible. For example, unless specifically otherwise noted, the claims reciting a single particular element also encompass a plurality of such particular elements.

What is claimed is:

1. A liquid delivery system comprising:
    a liquid supply;
    a liquid recipient having a liquid chamber;
    a fluid actuated valve fluidly connected between the liquid supply and the liquid chamber;
    a fluid source;
    a plunger between the fluid source and the fluid actuated valve, the plunger being movable between a first position fluidly connecting the fluid source and the fluid actuated valve and a second position blocking connection of the fluid source and the fluid actuated valve; and
    an air impermeable membrane adjacent the liquid chamber and operably coupled to the plunger to move the plunger between the first position and the second position.

2. The liquid delivery system of claim 1 further comprising a first spring resiliently biasing the plunger towards the membrane.

3. The liquid delivery system of claim 2 further comprising a bias resiliently biasing the membrane towards the plunger.

4. The liquid delivery system of claim 3, wherein the bias comprises a second spring.

5. The liquid delivery system of claim 4, comprising a pusher resiliently biased by the second spring.

6. The liquid delivery system of claim 1, further comprising a second liquid recipient, wherein the liquid chamber has an outlet fluidly connected to a second liquid recipient.

7. The liquid delivery system of claim 6, wherein the second liquid recipient includes at least one print head.

8. The liquid delivery system of claim 1 further comprising a structure having an inlet opening connected to the fluid source and an outlet opening connected to the fluid actuated valve, wherein the plunger is received and mounts within the structure.

9. The liquid delivery system of claim 8, wherein the plunger includes a passage and wherein the passage extends between the inlet opening and the outlet opening when the plunger is in the first position.

10. The liquid delivery system of claim 1, wherein the plunger is configured to rotate between the first position and the second position.

11. The liquid delivery system of claim 1, wherein the plunger linearly moves between the first position and the second position.

12. The liquid delivery system of claim 1, wherein the liquid supply is to contain a liquid and wherein the fluid source is to contain a fluid different than the liquid contained by the liquid source, wherein the liquid delivery system isolates the liquid from the fluid.

13. The liquid delivery system of claim 1, wherein the fluid actuated valve is remote from the plunger.

14. The liquid delivery system of claim 1, wherein the plunger comprises a neck down through which the fluid source is fluidly connected to the fluid actuated valve.

15. A method comprising:
   moving an air impermeable membrane adjacent a liquid chamber in response to withdrawal of liquid from the chamber;
   moving a plunger in response to movement of the membrane, wherein the plunger moves between a first position fluidly connecting a fluid source and a fluid actuated valve to open the valve and supply liquid to the liquid chamber and a second position blocking connection of the fluid source and the fluid actuated valve.

16. The method of claim 15 further comprising resiliently biasing the plunger towards the membrane.

17. The method of claim 15 further comprising resiliently biasing the membrane towards the plunger.

18. The method of claim 15 further comprising fluidly connecting an outlet of the liquid chamber to a second liquid recipient having a print head.

19. The method of claim 15 further comprising isolating fluid of the fluid source from the liquid of the liquid chamber.

20. The method of claim 15 further comprising passing the fluid from the fluid source through a fluid passage in the plunger to the fluid actuated valve when the plunger is in the first position.

* * * * *